US012010441B2

(12) United States Patent
Robinson et al.

(10) Patent No.: US 12,010,441 B2
(45) Date of Patent: Jun. 11, 2024

(54) INTELLIGENT LOCALIZED HIGH-RESOLUTION IMAGING OF TUBULARS

(71) Applicant: DarkVision Technologies Inc, North Vancouver (CA)

(72) Inventors: Stephen E Robinson, North Vancouver (CA); Kurt Kolb, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 18/224,589

(22) Filed: Jul. 21, 2023

(65) Prior Publication Data

US 2023/0362499 A1 Nov. 9, 2023

Related U.S. Application Data

(63) Continuation of application No. 17/035,887, filed on Sep. 29, 2020, now Pat. No. 11,758,291.

(30) Foreign Application Priority Data

Oct. 3, 2019 (GB) ..................................... 1914258

(51) Int. Cl.
*H04N 23/951* (2023.01)
*E21B 47/002* (2012.01)
(Continued)

(52) U.S. Cl.
CPC ....... *H04N 23/951* (2023.01); *E21B 47/0025* (2020.05); *G01N 21/8851* (2013.01);
(Continued)

(58) Field of Classification Search
CPC .... H04N 23/951; H04N 23/45; H04N 23/611; H04N 23/698; H04N 23/555;
(Continued)

(56) References Cited

U.S. PATENT DOCUMENTS

| 5,285,689 A | 2/1994 | Hapstack |
| 7,272,504 B2 | 9/2007 | Akimov et al. |

(Continued)

FOREIGN PATENT DOCUMENTS

| EP | 2597445 A1 | 5/2013 |
| GB | 2572834 A | 10/2019 |

(Continued)

OTHER PUBLICATIONS

Combined Search and Examination report received for GB application No. 1914258.7, dated Dec. 2, 2019, 8 pages.
(Continued)

*Primary Examiner* — Jacques M Saint Surin

(57) ABSTRACT

A device and method used to image wells and other fluid-carrying tubulars having localized features of interest. The device scans large areas of the tubular first in a low-resolution mode using an ultrasound sensor and in a high-resolution mode using a camera, then identifies areas that contain those localized features with some probability. The device images are stored for further image processing. The two sensors are axially spaced-apart on the device. A computer remote from the imaging device renders a visualization of the tubular and localized features using the optical and ultrasound images.

30 Claims, 12 Drawing Sheets

(51) Int. Cl.
| | |
|---|---|
| *G01N 21/88* | (2006.01) |
| *G01N 29/06* | (2006.01) |
| *G01N 29/07* | (2006.01) |
| *G01N 29/22* | (2006.01) |
| *G01N 29/26* | (2006.01) |
| *G01N 29/265* | (2006.01) |
| *G01N 29/44* | (2006.01) |
| *G01S 7/52* | (2006.01) |
| *G01S 15/89* | (2006.01) |
| *H04N 23/45* | (2023.01) |
| *H04N 23/50* | (2023.01) |

(52) U.S. Cl.
CPC ........... *G01N 29/069* (2013.01); *G01N 29/07* (2013.01); *G01N 29/225* (2013.01); *G01N 29/262* (2013.01); *G01N 29/265* (2013.01); *G01N 29/4427* (2013.01); *G01S 7/52065* (2013.01); *G01S 15/8915* (2013.01); *G01S 15/8922* (2013.01); *H04N 23/45* (2023.01); *G01N 2291/0234* (2013.01); *G01N 2291/0258* (2013.01); *G01N 2291/106* (2013.01); *G01N 2291/2636* (2013.01); *G01S 15/894* (2013.01); *G01S 15/8945* (2013.01); *H04N 23/555* (2023.01)

(58) Field of Classification Search
CPC . E21B 47/0025; E21B 47/00; G01N 21/8851; G01N 29/069; G01N 29/07; G01N 29/225; G01N 29/262; G01N 29/265; G01N 29/4427; G01N 29/0609; G01N 21/88; G01N 29/04; G01N 2291/2636; G01N 2291/106; G01N 2291/2634; G01N 2291/0258; G01N 2291/0234; G01S 15/894; G01S 7/52065; G01S 15/8915; G01S 15/8922; G01S 15/8993; G01S 15/892; G01S 15/8945
USPC .......................................................... 348/218
See application file for complete search history.

(56) References Cited

U.S. PATENT DOCUMENTS

| | | | |
|---|---|---|---|
| 7,357,021 B2 | 4/2008 | Blacklaw | |
| 7,698,937 B2 | 4/2010 | Neidhardt | |
| 8,931,344 B2 | 1/2015 | Girndt | |
| 9,765,609 B2* | 9/2017 | Chemali | ............... E21B 47/002 |
| 9,885,805 B2* | 2/2018 | Hayman | ............... G01V 13/00 |
| 10,605,948 B2 | 3/2020 | Wu et al. | |
| 10,781,690 B2* | 9/2020 | Malik | ................... B06B 1/0633 |
| 11,378,550 B2* | 7/2022 | Rae | ..................... G01N 29/0654 |
| 11,657,540 B2* | 5/2023 | Wrinch | .............. G01N 29/0654 |
| | | | 382/100 |
| 11,758,291 B2* | 9/2023 | Robinson | ............ E21B 47/0025 |
| | | | 73/622 |
| 2010/0044034 A1 | 2/2010 | Bailey et al. | |
| 2016/0259237 A1 | 9/2016 | Harris | |
| 2019/0101663 A1 | 4/2019 | Walters et al. | |

FOREIGN PATENT DOCUMENTS

| | | |
|---|---|---|
| GB | 2581181 A | 8/2020 |
| WO | 2016201583 A1 | 12/2016 |
| WO | 2018226314 A1 | 12/2018 |

OTHER PUBLICATIONS

Non-Final Rejection dated Jan. 6, 2023 in U.S. Appl. No. 17/035,887, 10 pages.

* cited by examiner

INTELLIGENT LOCALIZED HIGH-RESOLUTION IMAGING OF TUBULARS

CROSS REFERENCE TO RELATED APPLICATIONS

This application is a continuation of U.S. application Ser. No. 17/035,887, filed Sep. 29, 2020, which claims priority to claims priority to GB Application No. GB1914258.7, filed on Oct. 3, 2019, the disclosure of each of which is incorporated herein by reference in its entirety.

FIELD OF THE INVENTION

The invention relates generally to inspection of fluid-carrying conduits, in particular, acoustic sensors in oil & gas wells, water wells, geothermal wells, water mains or pipelines.

BACKGROUND OF THE INVENTION

In tubulars there often arises a need to inspect the structure for integrity. For example, hydrocarbons in production casing may contaminate ground water if there are cracks or deformations in the casing. Similarly, water resources may be lost to leaks in water mains. Ultrasound sensors and cameras located with an imaging device are known ways of imaging such structures to detect problems thus protecting the environment.

As these tubulars may be several kilometers long, the logging speed of the tool becomes an issue. To obtain high resolution images, the imaging tool captures a frame every millimeter, with as many scan lines as possible. However, at practical memory limits, frame rates and processing speeds, it becomes very difficult to log tubulars that are many kilometers long.

Existing ultrasound tools comprise an array of piezoelectric elements distributed radially around the tool housing. The top surface of each element faces radially away from the tool towards the wall of the tubular. The reflected waves are received by the same elements and the pulse-echo time of the waves are used to deduce the distances to the inner and outer walls and voids therebetween. The elements may be angled away from a normal sonification at the surface, such that some of the energy reflects away from the sensor and some backscatters off features, per PCT Application WO 2016/201583 published Dec. 22, 2016 to Darkvision Technologies.

In some logging operations, the whole tubular need not be imaged, but only certain areas where a localized feature of interest exists. As used herein, localized features may be perforations, connections, wash-outs, fiber cable clamps (i.e. features that do not extend over the entire well or pipe. However, currently such operations require that a large length of the tubular be imaged in high-resolution and stored for subsequent visualization at the surface. This limits the logging speed of tools to a few meters per minute.

SUMMARY OF THE INVENTION

To address the shortcomings of the current tools, a new downhole tool and method are provided that separate the operation into scanning for candidate localized features and then imaging them. The scanning uses a low-resolution mode to generate first images that are then processed in real-time using a processor to detect candidate features. The imaging of the candidate area uses a high-resolution mode. The high-resolution images may be processed offline or also in real-time.

In accordance with a first aspect of the invention there is provided a method of imaging localized features in a tubular, comprising: deploying and continuously logging an imaging device longitudinally through the tubular, which imaging device comprises a) a phased array ultrasound sensor and b) a camera, longitudinally spaced-apart from the ultrasound sensor, and having a higher density of sensor elements than the ultrasound sensor; imaging the tubular with the camera to generate optical images; imaging the tubular with the phased array ultrasound sensor to generate ultrasound images; wherein both optical images and ultrasound images capture localized features in the tubular; and processing the optical and ultrasound images to visualize the tubular and localized features to a user.

In accordance with a second aspect of the invention there is provided a system for imaging localized features in a tubular in an oilwell including: an elongate imaging device deployable in and moveable through the tubular; a phased array ultrasound sensor of the imaging device; a camera of the imaging device, longitudinally spaced-apart from the phased array ultrasound sensor and having higher density of sensor elements than the ultrasound sensor; one or more memory units for storing sensor data. There is a processor arranged to: operate the camera to image the tubular to generate optical images; operate the phased array ultrasound sensor to image the tubular to generate ultrasound images; and store images of the images in the memory. Wherein both optical images and ultrasound images capture localized features in the tubular. The system includes a computer remote from the imaging device and arranged to process the optical and ultrasound images to visualize the tubular and localized features to a user.

In accordance with a third aspect of the invention there is provided a method of imaging localized features in a tubulars, comprising: deploying and continuously logging an ultrasound imaging device longitudinally through the tubular; scanning the tubular with a first sensor of the device to generate first data; automatically identifying candidate localized features of the tubular using the first data; defining areas surrounding candidate localized features; and imaging the defined areas using a second sensor, longitudinally spaced-apart from the first sensor, to generate second data.

In accordance with a fourth aspect of the invention there is provided a device for imaging localized features of a tubular comprising: an elongate body deployable in and moveable thru the tubular; a first sensor and second sensor, longitudinally spaced-apart from each other; one or more memory units for storing sensor data; and a processor arranged to: operate the first sensor to scan the tubular for localized features; operate the second sensor to image the localized features; and store images of the localized features in the memory.

The step of imaging captures data may be at a higher resolution than the step of scanning.

The higher resolution may be due to higher density of elements in the second sensor compared to the first sensor. The higher resolution may be due to a higher frame rate used for the second sensor compared to the first sensor.

The localized features may be at least one of: perforations, ports, holes, corrosion pits, cracks, connections, wash-outs, or cable clamps.

Identifying candidate localized features may include comparing first data to first sensor characteristics that define a selected feature type.

The first sensor or second sensor may include an electromagnetic sensor array. The first sensor or second sensor may include an ultrasonic sensor array, preferably arranged as a phased-array. The first sensor or second sensor may be an optical array. The first sensor or second sensor may be a radial array of sensor elements. The second sensor may include a radial-facing sensor rotated about a longitudinal axis of the device through a sector angle containing each defined area.

Setting imaging parameters of the second sensor may be based on a type of the localized feature.

The method may image process the second data to create a geometric model of the tubular and the localized features. The steps of scanning and imaging capture a surface of a casing in the tubular.

The one or more memory units stores second sensor parameters based on a type of the localized feature.

The one or more memory units further stores instruction operable by the processor to: identify candidate localized features of the tubular using first data generated by the first sensor; define areas surrounding candidate localized features; and directing the second sensor to image at the defined areas to generate second data.

The one or more memory units stores a features database that defines a plurality of feature types by signal characteristics for the first sensor.

The second sensor comprises a radial-facing sensor rotated about a longitudinal axis of the device through a sector angle containing each defined area.

Thus preferred embodiments of the invention enable the device to image localized features in high-resolution while continuously logging the tubular at high speed.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

DETAILED DESCRIPTION OF THE PREFERRED EMBODIMENTS

With reference to the accompanying figures, devices and methods are disclosed for capturing, processing, and storing images from tubular, particularly localized features of the tubular. The tubular may carry hydrocarbons or water and has an elongate, cylindrical form factor through which the device can move longitudinally. The device typically also has an elongate form factor and is sized to be deployable within the well or pipe. Wells include cased and uncased wells, at any stage from during drilling to completion to production to abandonment.

An object of the present invention is to image certain localized features, such as perforations, small localized areas of corrosion and clamps. As used herein, localized features are only located in a small unknown area, and do not extend over the whole tubular. Thus they can be imaged by a sub-field of the full imaging field of the sensor. Localized features should also be sufficiently distinct that they can be identified by automated techniques. Thus small patches (10-100 mm$^2$) of heavily pitted pipe would be a localized feature to target, whereas general corrosion of the surface would be a continuous feature imaged using existing full-field techniques.

As a persistent example used hereinbelow, the localized feature may be a perforation thru a production casing of an oil well. Perforations are typically 7-12 mm in diameter and spaced apart in a production section of the tubular. The (lack of) reflections at the middle of a perforation and glints from the edges make such a feature detectable using automated techniques.

Figure 1:
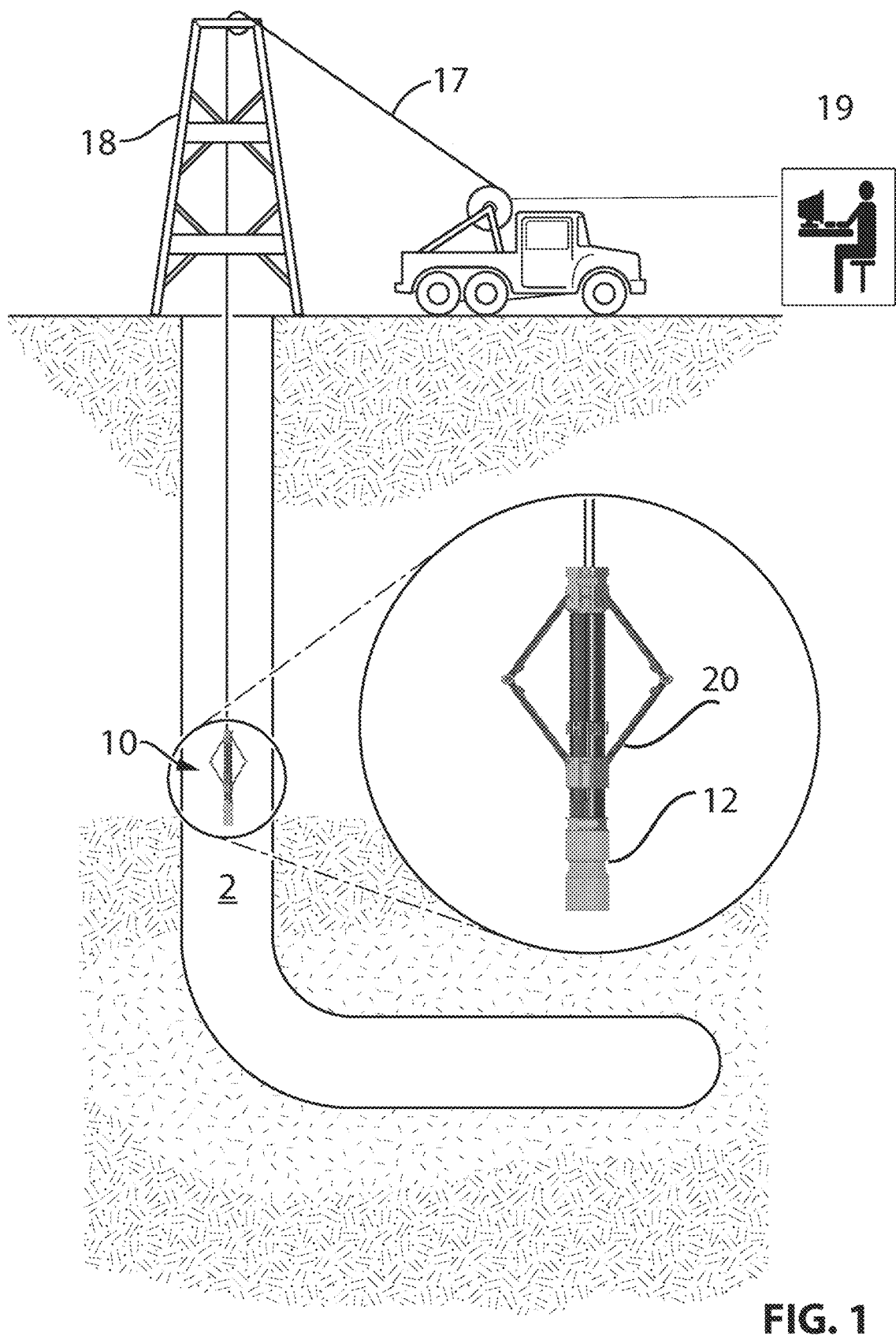
FIG. 1 is a cross-sectional view of an imaging device deployed in a tubular in accordance with one embodiment of the invention.
Figure 2:
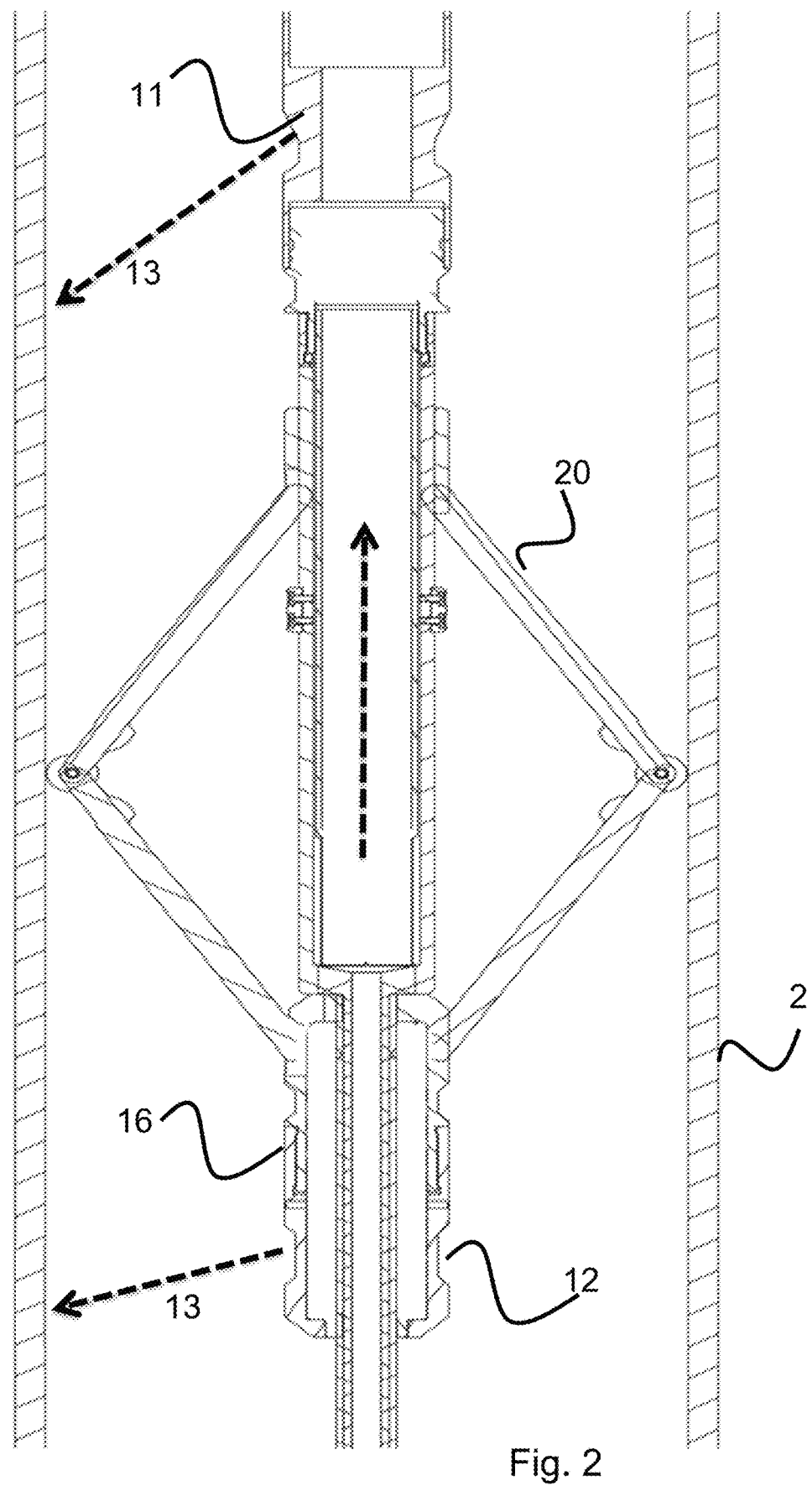
FIG. 2 is a cross-sectional view of an imaging device in a well.

In accordance with one embodiment of the invention, there is provided an imaging device 10 for imaging a tubular 2, as illustrated in FIGS. 1 and 2. The imaging device 10 generally comprises a first sensor 11, a second sensor 12, a body 16, a processor 14, and one or more centralizing elements 20. In use, the first sensor is upstream and the second sensor is downstream with respect to the logging direction, such that localized features reach the first sensor before the second sensor.

The first sensor provides a low-resolution scanning of the whole cross-section of the tubular in an initial pass, and the second sensor provides a high-resolution imaging of the localized area of interest in a subsequent, slightly later, pass. The sensors are separated by some distance D in the axial direction of the device to provide some transit time during which the processor identifies candidate areas for imaging by sensor 12.

The First Sensor is preferably an optical array or an acoustic array as described below, however, given the lowered precision initially needed, it may be another sensor type such as an electromagnetic sensor (e.g. eddy current sensor, magnetic flux sensor), micro-caliper, or micro-radar sensor. The first and second sensors may have similar resolutions, such that the processor uses the second image to combine with or confirm localized features detected in the first image. However in preferred embodiment, the First Sensor has lower sensor density, uses simpler electronics, and/or processes less signals in order to identify an area of the tubular having a localized feature with some probability. For example, a micro-caliper array having just 10 arms could detect a perforation within a sector of 36° with simple signal processing.

However, a first sensor based on an acoustic array or camera provides more flexibility in the types of features to target, with increased detection confidence but at the cost of more complexity.

Preferably the second sensor is a high-resolution camera or an array of acoustic sensor elements, more preferably arranged as a phased array. Preferably, compared to the first sensor, the second array has higher sensor density with processing circuits that support higher resolution imaging. The relative resolution and design options are discussed below.

In one embodiment, the first sensor is an optical or ultrasonic sensor and the second is a magnetic sensor. This arrangement provides confirmation sensor data at a candidate location.

The axial resolution depends on the logging speed and frame rate. For example, for a device moving axially at 15 m/s, in low-resolution mode of a frame rate of 60 fps the axial resolution will be 4.2 mm. In high-resolution imaging mode of 200 fps, the axial resolution will be 1.25 mm.

Optical Sensors

A line camera or the more common matrix camera may be used to scan and image the tubular. The Second Sensor may be characterized by one or more of: a high pixel-count array; electronics supporting a high frame rate (100 fps+); higher pixel depth (12-bit+), and RGB channels. Conversely, the First Sensor could have lower pixel count, lower frame rate, lower pixel depth and monochrome elements.

Downhole cameras similar to those used in wells currently may be suitably modified to provide the First or Second Sensors. For example, US20160259237A1 "Side view downhole camera and lighting apparatus and method" filed 19 Nov. 2014 describes a side-view camera that is rotated with a motor to capture 360° around the casing. Alternatively the camera system may comprise four radial-facing cameras, each capturing slightly overlapping sectors of the well to capture a 360° image, after stitching sectors together.

Similar to alternative ultrasound embodiments described hereinbelow, an optical sensor may be use in: a rotating head embodiment; two sensors of similar specifications providing redundant imaging; or a single sensor array that is axially displaceable.

Acoustic Sensor Arrays

Figure 3A:
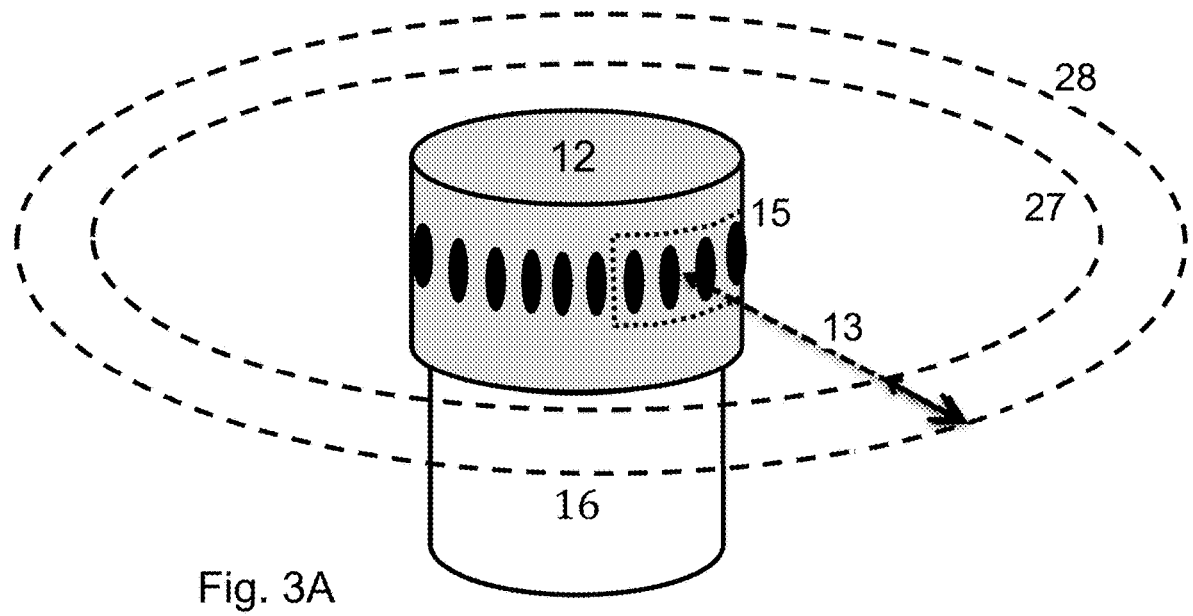
FIG. 3A is a perspective-view of a radial acoustic array and its imaging field.
Figure 3B:
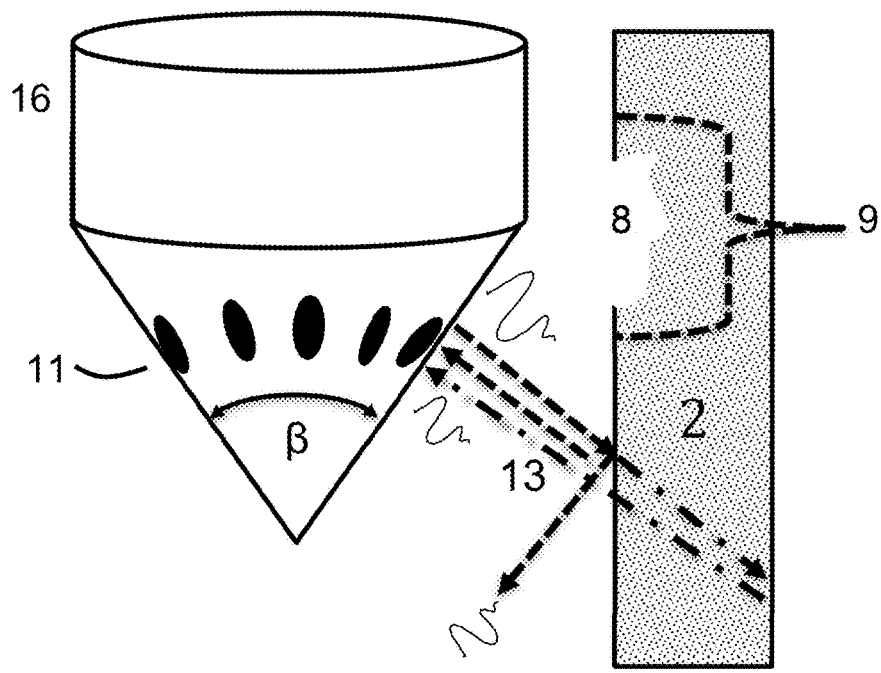
FIG. 3B is a perspective-view of a radial acoustic array in a conical arrangement.

An acoustic sensor array comprises a plurality of acoustic sensor elements, preferably operating in the ultrasound band, preferably arranged as an evenly spaced one-dimensional radial array (see FIGS. 3A, 3B). The frequency of the ultrasound waves generated by the sensor(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron-sized point scatterers. The sensors may be piezoelectric, such as the ceramic material, PZT (lead zirconate titanate). Such sensors and their operation are well known and commonly available. Circuits 14 to drive and capture these arrays are also commonly available.

The number of individual elements in the sensor array affects the azimuthal resolution of the generated images. Typically, each sensor array is made up of 32 to 2048 elements and preferably 128 to 1024 elements. The logging speed and frame rate determines the axial resolution. Multiple sensor elements, per aperture 15, operate in a phase delayed mode to generate a scan line 13. There may be as many scan lines as elements by changing the aperture by a single element for each scan line.

The sensor elements may be distributed radially, equidistant around the body of the device. As seen in FIG. 3A, the sensor elements 13 may be substantially outward, radially-facing. A first reflection is received from the inner wall and then a second reflection is received from the outer wall. However, there may be multiple reflections as the wave bounces between walls. A receive window Rx is pre-set by the operator or device for when the processing circuit 14 should start and end recording of reflected waves. For example, in the case of a large diameter, thick casing in fluid with a slow speed of sound, the device can start recording later and for longer.

This sensor arrangement captures a ring-shaped cross-sectional slice (from 27 to 28) of the tubular covering up to 360° around the array 12. As the device is moved axially in the tubular the ring-shaped sensor captures slices of the tubular that are perpendicular to the longitudinal axis of the well. Plural slices are combined to detect or image the localized object.

In the alternative arrangement of FIG. 3B, the sensor elements are distributed on a frustoconical surface with elements facing partially in the longitudinal direction of the device, (and thus in the longitudinal direction when in the well). Thus, the radial sensors are angled uphole or downhole to form an oblique-shaped conical field of view. The cone may have a cone angle β of 10-45°, preferably about 20'. In this arrangement, much of the sound wave reflects further downward, but a small portion backscatters off features in the wall back towards the sensor. FIG. 3B shows acoustic pulses (moving in the direction of the dashed lines) transmitted towards inner wall, most of which bounces downward and some backwards to the sensor 11. Some of the wave energy (dot-dashed lines) propagates to the outer wall, then partially back to the sensor.

This conical design may also face uphole, i.e. towards the proximal end of the device and the operator. Either of the sensors 11, 12 may be located at an end of the device (e.g. FIGS. 3A, 3B) or between the ends (e.g. FIG. 2).

Scan Frame

An acoustic sensor element can both transmit and receive sound waves, in a pulse-echo arrangement. A plurality of sensor elements cooperates as a phased-array to generate a steered and focused wavefront. In FIG. 3A, scan line 13 (dashed line) appears to radiate out from the center of the four sensors in aperture 15 (enveloped by the dotted line). The number of scan lines N that make up a full frame may be the same as the number of elements M in the array, but they are not necessarily the same.

The timing of each scan comprises a transmission window Tx, receiving window Rx and dwell period therebetween. As used herein, a scan line 13 is the stream of data received during Rx and may be converted to physical coordinates using the speed of sound thru the fluid.

By way of example, the transmission step may include selecting the elements in the aperture, calculating beam-forming timings, loading the pulse timings from the FPGA 84, activating the pulser 81 and MUXes 82 to pulse all elements. The dwell period may be set by the operator based on the expected diameter of the pipe and speed of sound in the well fluid. The Rx window may be set to capture the first reflected pulse from the inner radius of interest (27) until the last element has received the last pulse that could reflect off the outer radius of interest 28 (See FIGS. 2A and 7). The scan line's capture radii 27/28 will normally be wider than the actual wall thickness.

As discussed above, the aperture 15 is a set of neighboring sensor elements that individually contribute towards the constructive wavefront and increase its acoustic energy. There may, for example, be 32 or 64 elements in the aperture that are selected from the whole array by multiplexors. Normally these are a symmetrical set of elements opposite the pipe spot to be sonified, i.e. the sonified spot and aperture centre have the same azimuthal angle θ, relative to the center of the device.

Figure 4:
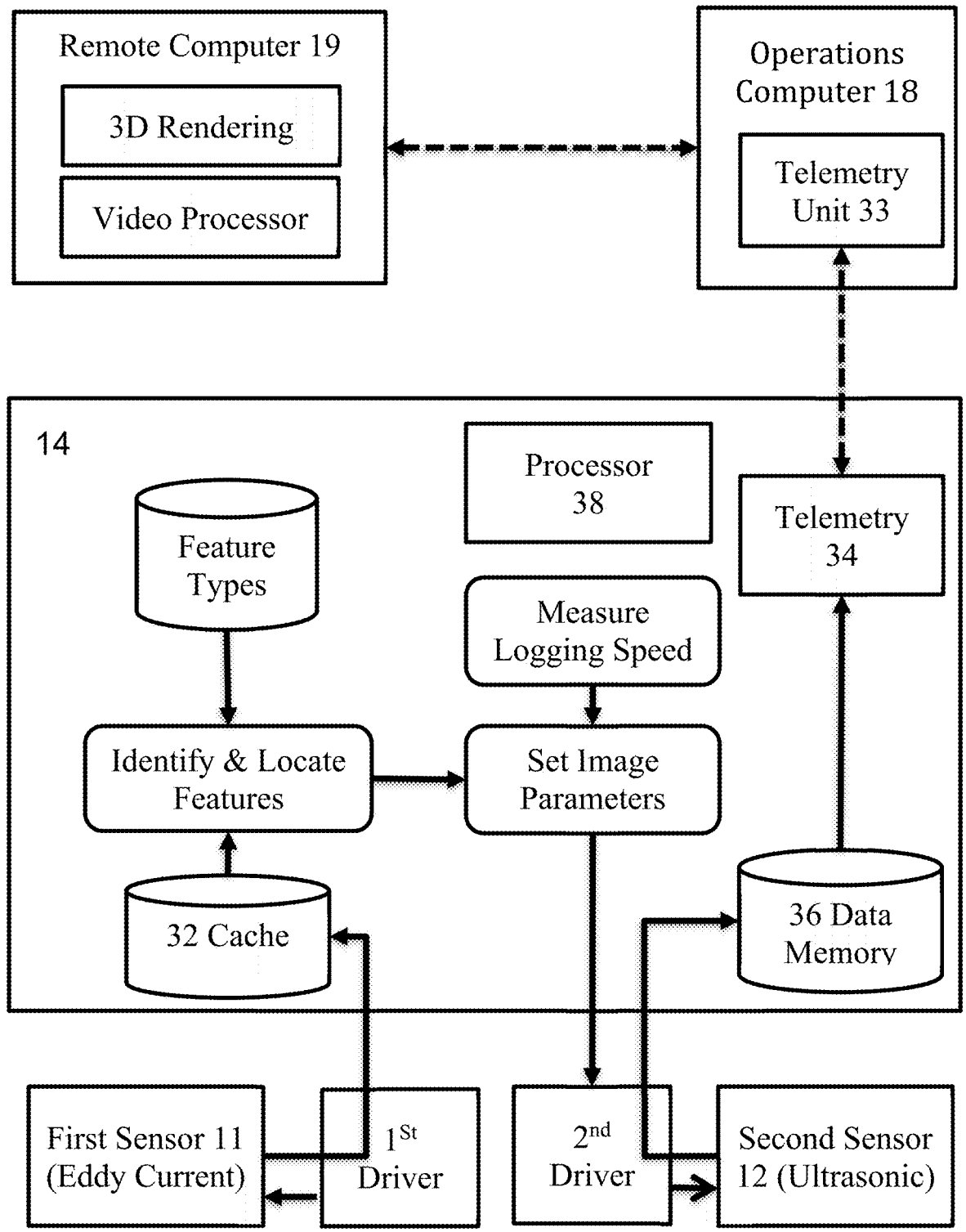
FIG. 4 is a block diagram for compressing ultrasound data.
Figure 5:
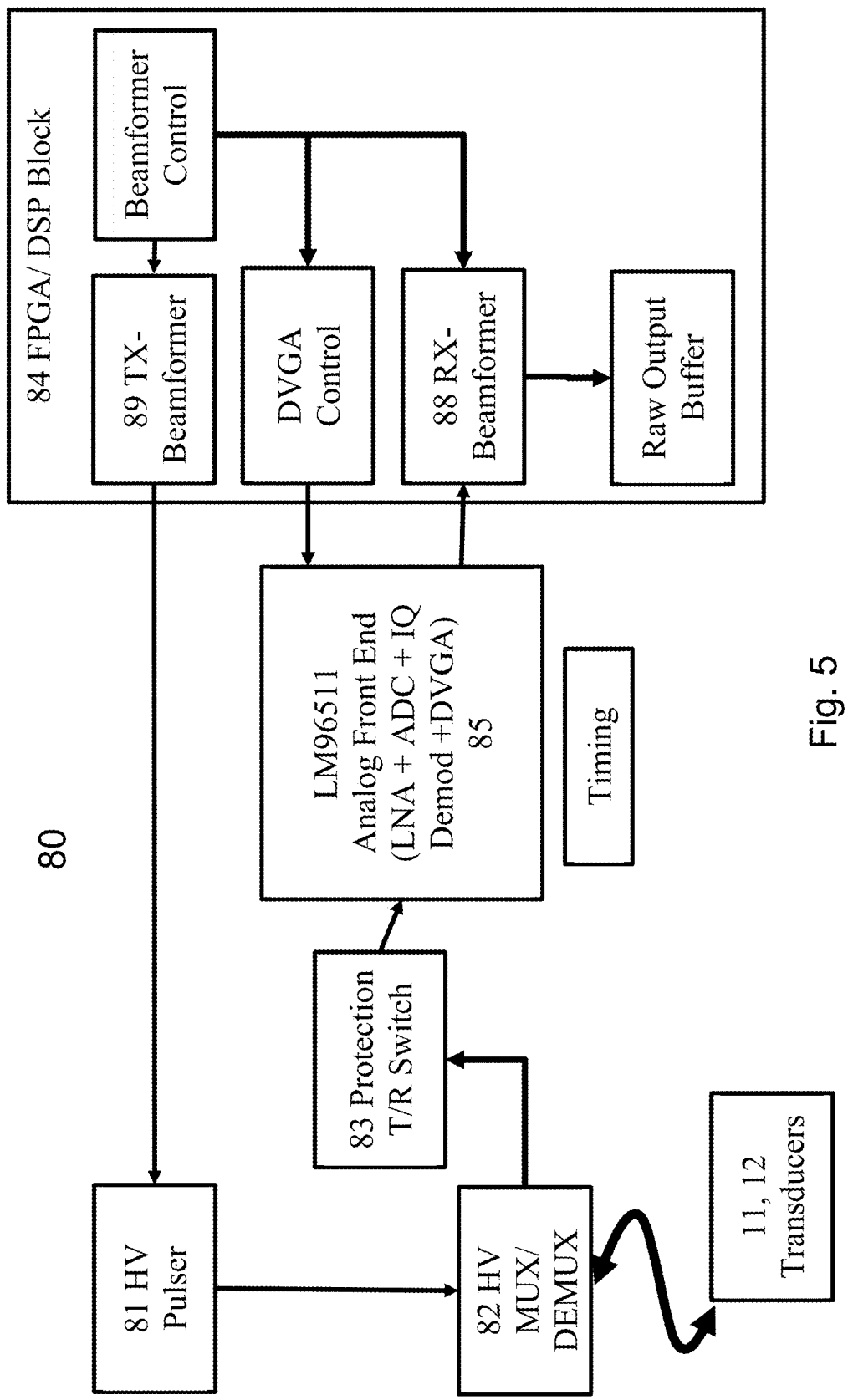
FIG. 5 is a circuit block diagram for driving ultrasound sensors.
Figure 6:
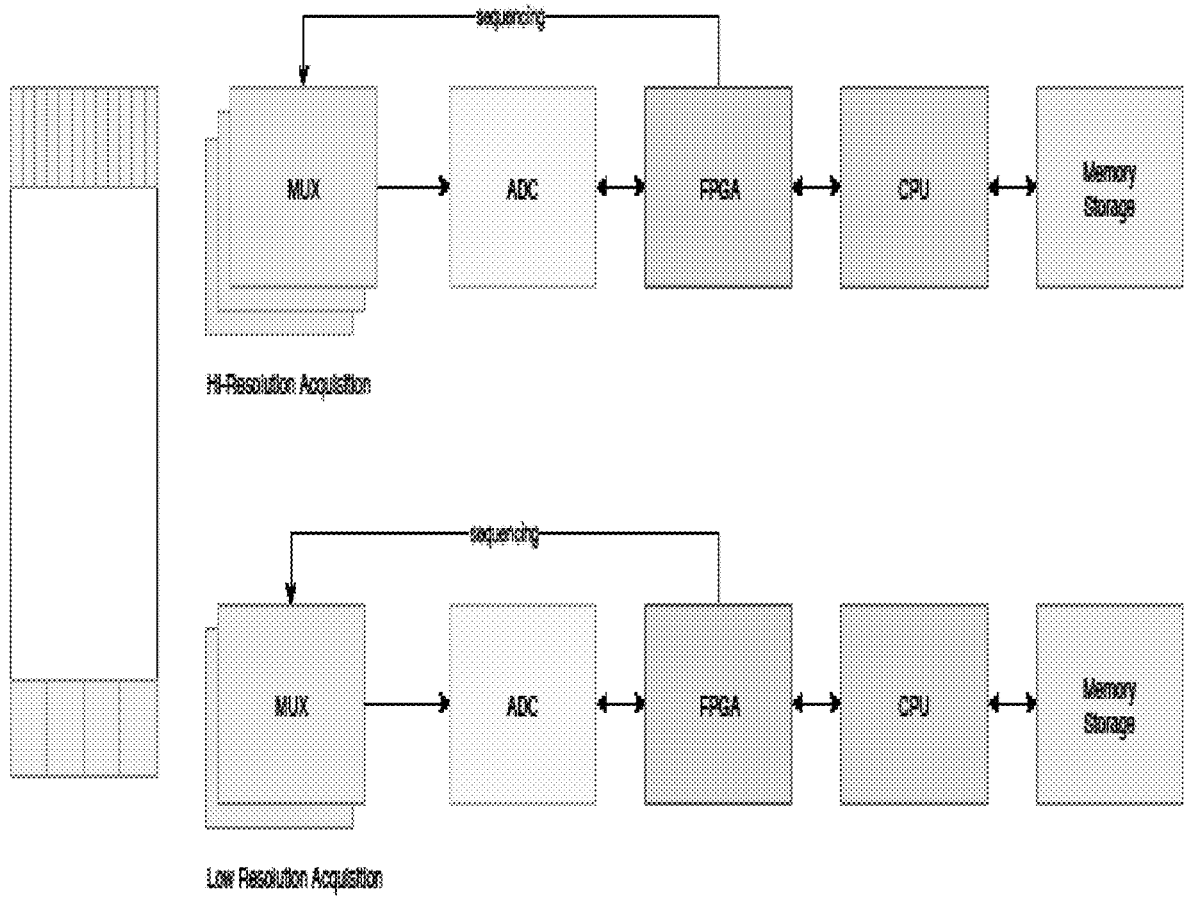
FIG. 6 is a signal flow diagram for processing data in scanning and imaging modes.

FIG. 5 shows an example circuit 80 dedicated to transmitting, receiving and processing ultrasound waves. These circuits are common in ultrasound imaging and the skilled person is assumed to be familiar with chips, such as LM96511 from Texas Instruments. The raw, digital output of FIG. 5 is written to non-volatile Data Memory 36, shown in FIG. 4.

From the above discussion on sensor arrays, a number of different parameters are clearly selectable for optimizing the scanning and imagine modes. Examples of parameter selections are provided in the embodiments that follow.

Double Radial Array

Figure 7:
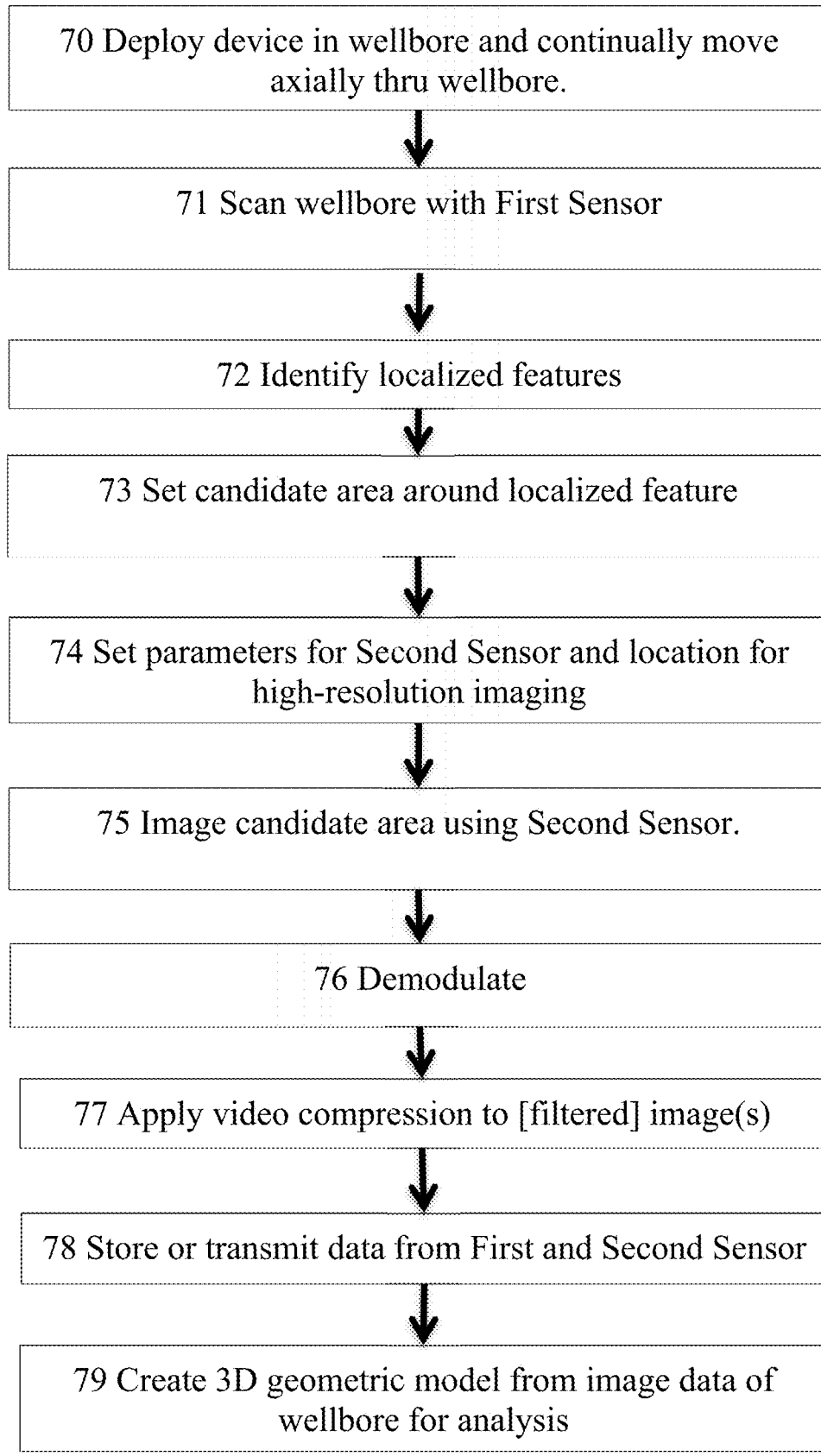
FIG. 7 is a flowchart for scanning and imaging localized features.

A preferred embodiments is shown in FIG. 7, whereby a First Sensor Radial Array 11 is axially separated from Second Sensor Radial Array 12. As shown, the first sensor has fewer sensing elements (or is less dense) but scans radially all around the device. Conversely the second sensor has densely arranged elements but only images sector 26.

Compared to the Second Sensor Array, the First Sensor Array uses parameters that optimize for lower-resolution and lower data rate. The First Sensor Array's may be designed with one or more of the following: a) a lower density of sensor elements, e.g. ≤128 elements or ≤256 elements; b) lower frame rate, e.g. ≤25 fps or ≤50 fps; c) fewer elements in the aperture, e.g. ≤16 elements; d) no beamforming; e) lower frequency, e.g. ≤1 MHz.

Rotating Head Imaging Array

In certain embodiments, the second sensor is physically rotatable relative to the housing of the device. This is sometimes called a 'spinning head'. This second sensor may comprise one or more sensor elements that rotate to a starting angle then rotate while imaging to an end angle, thus sweeping the candidate area. In the case of a single element, the second sensor may be quickly swept back and forth several times at high frame rate to capture the area in both high azimuthal and high axial resolution.

The second sensor may use the sensor disclosed by patent application GB1813356.1 entitled "Device and Method to Position an End Effector in a Well" to Darkvision Technologies Inc, incorporated herein by reference. As disclosed therein and shown in FIG. 8 end-effector 46 is rotatable (motion Θ about axis Z) and laterally translatable in transverse plane Y, X. In this case array 12 comprises sensor elements distributed in the longitudinal axis of the device, such that sweeping the array about Z or translating sideways (i.e. perpendicular to the array) captures a 2D image of the surface of the tubular.

To capture a high-resolution image, the second sensor sweeps across the sector of the candidate area fast enough, relative to the logging speed, to achieve the desired azimuthal resolution.

Axially Displaced Single Array

In an alternative embodiment, a single radial sensor array is used to perform both the low-resolution scanning mode and high-resolution imaging mode. The array is located on an axial displacement portion, connected to an actuator. The actuator displaces the array in a direction opposite to the logging direction and at a higher speed than the logging speed. Thus the single array gets at least two passes at the same features: the first time scanning for candidate localized features; the second time imaging just the localized candidate area; wherein the processor identifies localized features and proposes candidate areas for imaging.

The array be located on a first device that is coupled to a stroker device. The first device may hold the electronics for operating the sensor and processing/storing ultrasound images. The stroker may be a version of those know in the art, adapted to counter the speed and movement resolution needed to counter the logging movement. The stroker comprises an actuator (e.g. hydraulic cylinder) for displacing the first device. Compared to certain strokers, the present stroker is designed for speed, rather than pushing strength.

Figure 8:
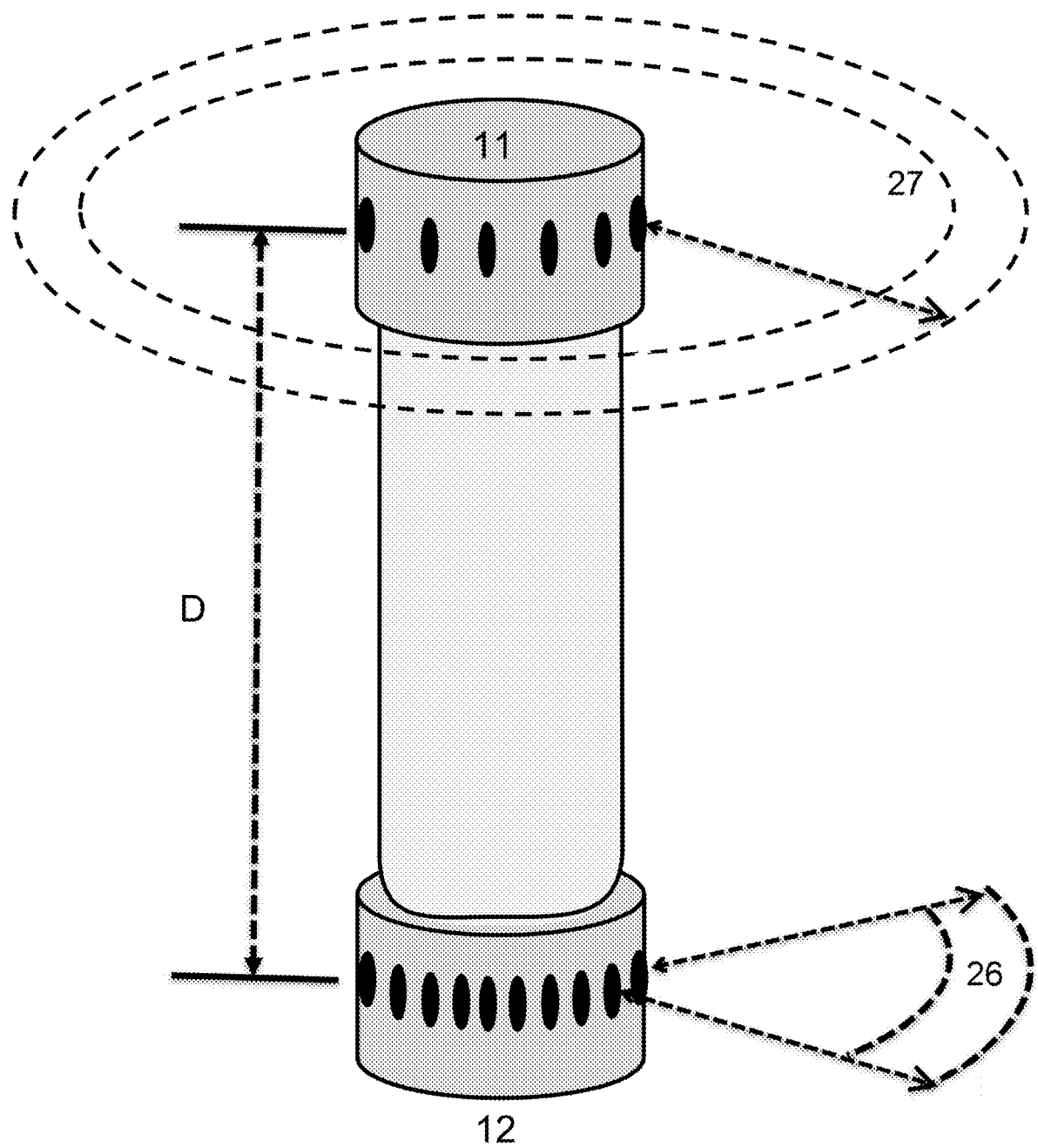
FIG. 8 is a side view of an imaging device with two radial arrays.

The array may be connected to and axially displaced by an actuator within the body of the imaging device. One such device is disclosed by patent application GB1813356.1 entitled "Device and Method to Position an End Effector in a Well" to Darkvision Technologies Inc. As shown in FIG. 8, sensor array 12 is located on an end effector 46 and axially displaced by distance D by a rod or screw 41 connected to actuators, such as stepper motors.

The length of the stroke, like the separation distance D of FIG. 8, provides time for the processor to identify candidate features and set up the sensor to operate in high-resolution mode. For example, the MUX channels and the FPGA phase delays are set for the aperture in the sector of the array opposite the localized area to image.

Indeed, the array may get more than two captures or a continuous capture of a localized area by re-displacing the array or speed matching the logging speed.

Surface Imaging Using Time of Flight

Figure 9:
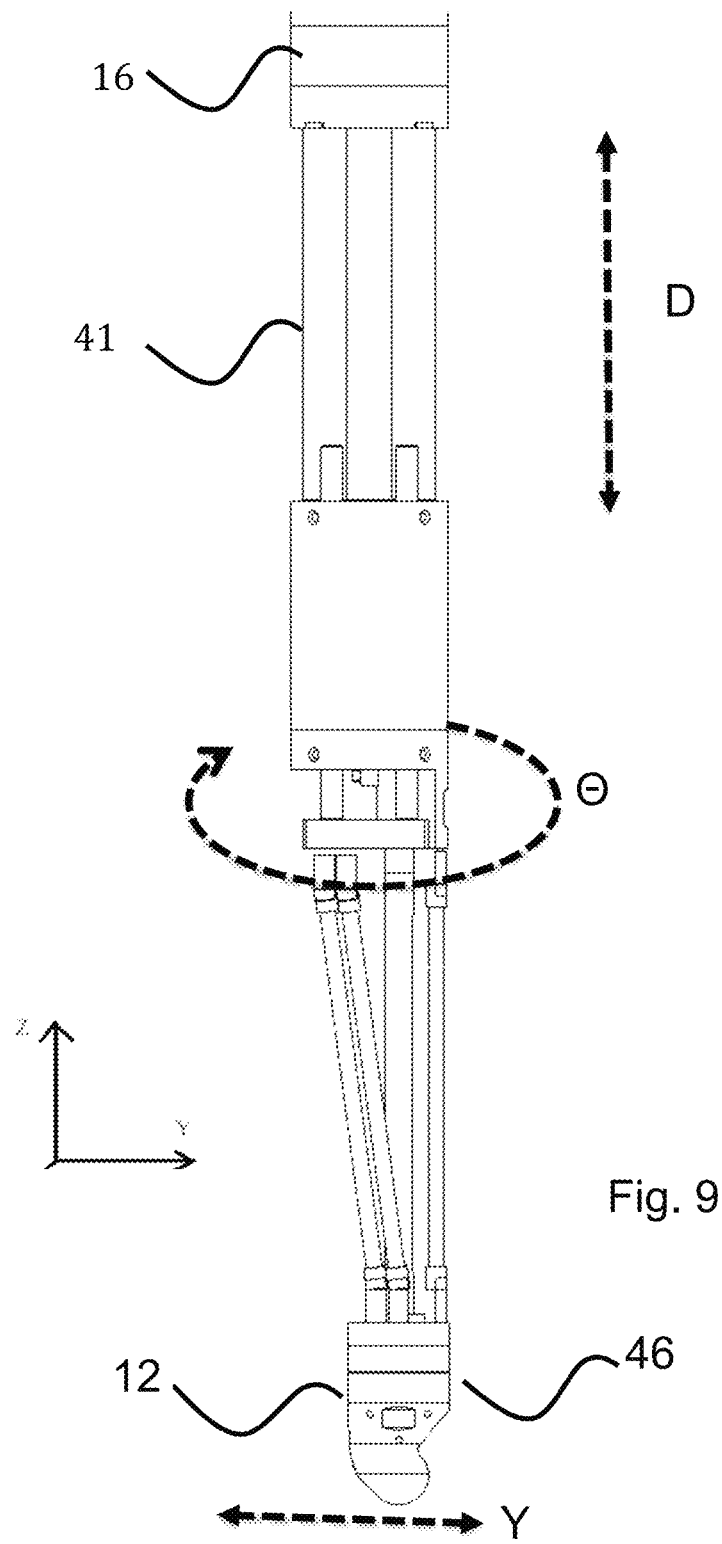
FIG. 9 is a side view of an imaging device on an end effector.
Figure 10A:
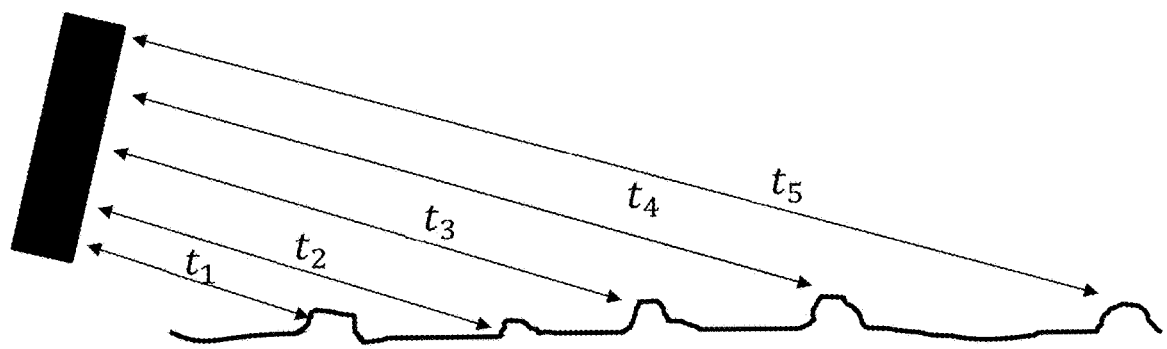
FIG. 10A is an illustration of reflections off micro features in a high angle of incidence embodiment.
Figure 10B:
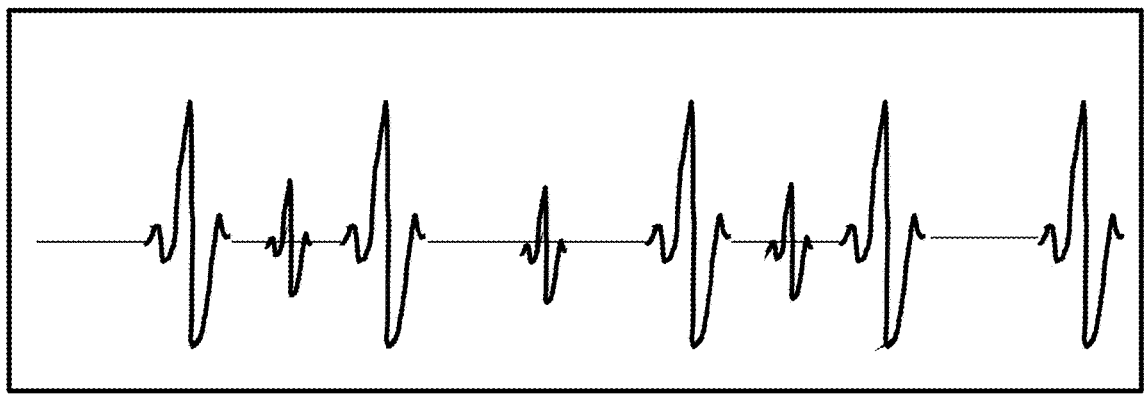
FIG. 10B is a graph of reflection timings from the embodiment in FIG. 9A.

Patent application GB1901669.0 filed 6 Feb. 2019 entitled "Acoustic Surface Imaging Using Time of Flight," incorporated herein in its entirety, discloses how to capture surface data of a well or pipe by setting the sensor to sonify the surface at a high angle of incidence. This defocused wave captures an axially enlarged area and separates reflections from point scatterers within that area by their time of flight $t_1$-$t_5$ (see FIGS. 9A and 9B). That is, reflections that return later come from further points along the surface, whereby the distances are convertible from knowing the speed of sound in the fluid.

This sensor arrangement may be used for the various scanning and imaging steps described above, including use the first and/or second sensor array or in the axially displaceable single sensor array embodiment above. As in the above embodiments, the resolution may be increased by using more sensor elements, higher frame rate, and adjusting sensor settings. In this sensor arrangement, imaging may also be improved by increasing the oversampling, i.e. the amount of overlapping area in consecutive frames, which overlapping is useful in image processing to remove noise and reinforce true surface scatters. This approach also provides good registration as the point reflectors move from frame to frame from which the processor can measure the logging speed.

For example, in low-resolution scanning, consecutive frames may overlap very little or not at all. A localized feature type may simply be defined by two or more strong reflections separated by a certain time/distance. This makes real-time identification possible. Conversely, for high-resolution imaging there may be 60-80% area overlap on consecutive frames, capturing the same points 3-5 times. The image processing becomes more complex here, as the processor performs autocorrelation of multiple frames to remove noise, enhance real features and correct for changes in incidence angle.

Selection of Feature Type

In order to quickly identify candidate features and candidate areas and reduce the number of areas to image in high resolution, it is preferable to select the feature type of interest before the logging operation. Each feature type is associated with machine readable definitions and assumptions, such as form factor, shape, size, spacing between features, surface texture. Each feature type may be defined by plural characteristics for the first sensor. Such definitions may specify the expected size, aspect ratio, and signal strength that the first sensor would return if the first data set contained that feature type. For example, a 'perforation' feature type may be defined by an azimuthally rotatable set of signal ranges for each of N acoustic elements in the first array, over S frames, including a contiguous region having weak reflections where the perforation is located.

Detection Algorithms

Once the feature type is selected, the definitions of the expected feature type are loaded into cache on the device processor 14 and continually compared in real-time to incoming data from the first sensor. The processor may use detection algorithms to determine matching values greater than a threshold value to identify candidate areas that contain that feature type with some probability. By determining the azimuth and depth ($\Theta$, Z) where the match is strongest, the processor identifies candidate locations ($\Theta$, Z) that needs to be further imaged using the second sensor.

Figure 11:
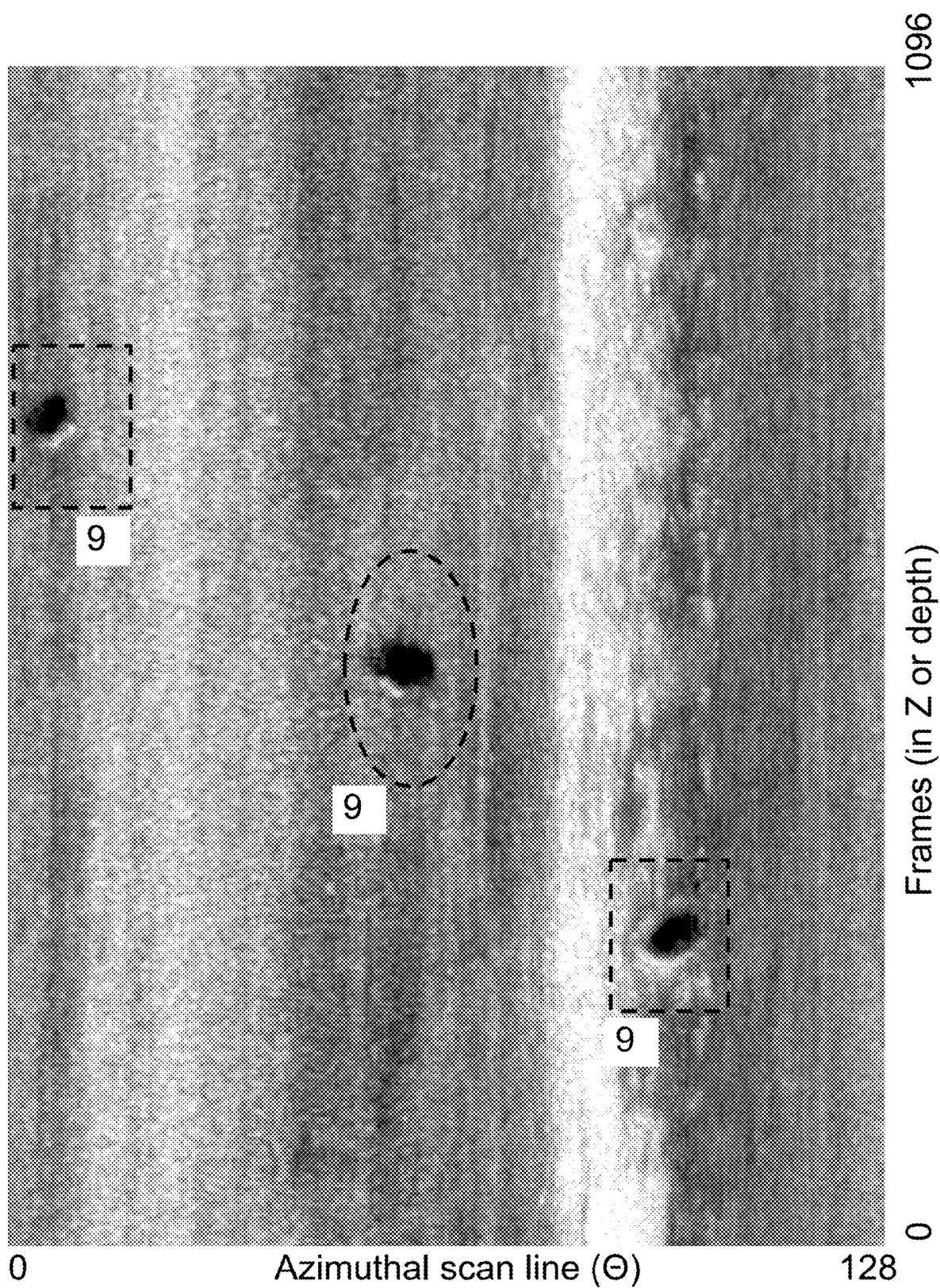
FIG. 11 is an unwrapped low-resolution scan of a cylindrical pipe with localized features.
Figure 12:
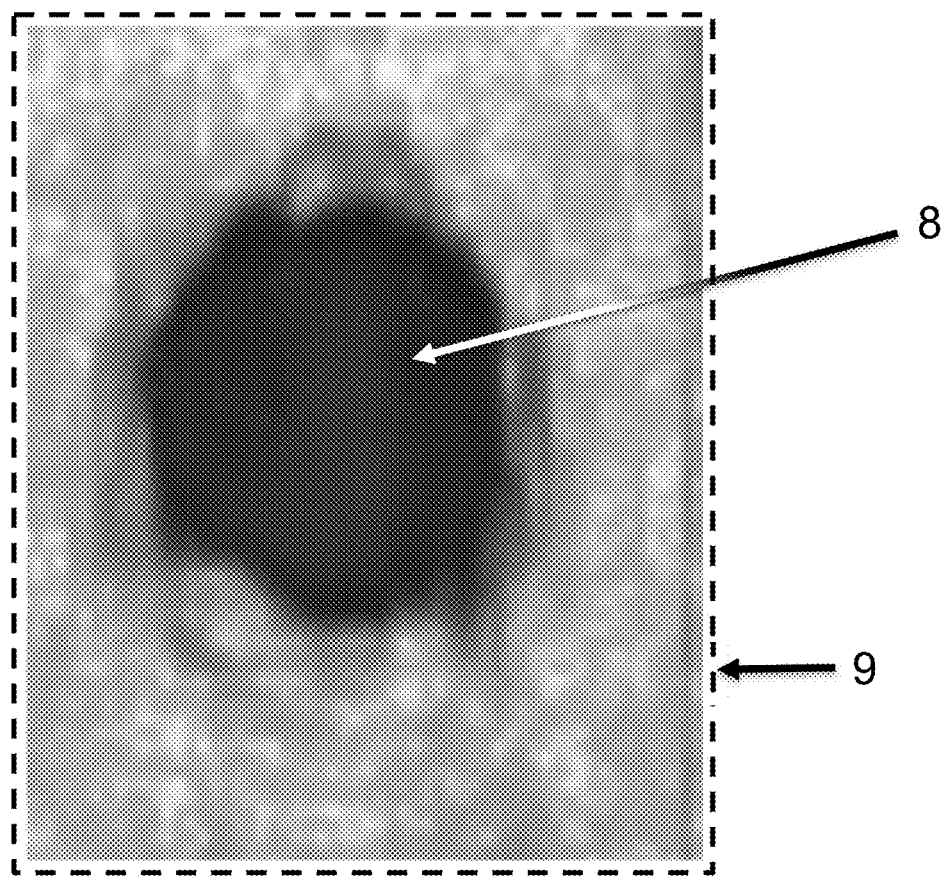
FIG. 12 is a high-resolution scan of a localized features.

As seen in FIG. 11, candidate area 9 can be defined by bounding box, centered at the identified location and as wide ($\Delta\Theta$) and tall ($\Delta Z$) as the localized feature. The candidate area could also be defined as a circle or oval centered at the candidate location with diameter similar or larger than the feature size. In order for the second image to be of significantly higher resolution, it is preferable to keep the candidate area as small as possible, e.g. just larger than the expected or observed feature's size.

FIG. 7 is a low-resolution 2-D ultrasound image that has captured three perforations, which were then auto identified and bounded by areas 9.

The detection algorithm may be one or more of: autocorrelation, circle find, Convolutional Neural Net, Region Proposal, Template matching, computer vision properties of candidate features. Such algorithms are known to the skilled person and may be modified to work with a given First Sensor data.

To simplify the processing for identifying localized features in the first sensor data set, the data may be pre-processed or less data may be used compared to the second data set. For example, for the first data set, the processor may use only the first reflection, only the strongest reflection or only reflections within a limited receive window.

Each candidate area may be converted to units native to the second sensor, e.g. sector angle, number of scan lines, aperture size, frame rate, and start time given the separation distance D. The Second Sensor may then be coordinated by physically moving the sensor or electrically activating the appropriate elements to image each candidate area. Each feature type may also be associated with parameters for optimizing the second sensor for imaging them. For example, lower resolution parameters may adequately image large feature types or angled beam forming may optimally capture the edges of cable clamps.

This second sensor captures a high-resolution image and stores it in non-volatile device memory 36 or sends it to an Operations Computer 18. The image may be processed on the device or on a remote computer 19 either in real-time or after logging. The memory required for the set of second sensor images is much less than imaging the entire tubular and enables the image processing to focus only on these smaller areas.

Registration

In order for the high-resolution imaging pass to image the candidate area 9 accurately, the logging speed should be steady and known. The device may comprise sensor(s) and processing to observe the axial logging speed of the device through the tubular. From this logging speed, the device's processor determines when to start the imaging. Given the inherent uncertainty in the instantaneous logging speed, the candidate area 9 is set sufficiently axially longer than the size of the localized feature that has been identified.

For example, sensors in wheels contacting the tubular surface may directly measure the speed of the device relative to this tubular. Alternatively, the device processor 14 may determine the logging speed by processing the images from the First or Second Sensor to register the scanned features of the tubular and calculate the axial movement of these features from between frames or from first sensor to second sensor. Any one of the sensors can also be used for registration by detecting micro features provided they have sufficient axial resolution and sufficiently large axial field of view to capture multiple distinguishable micro features. The processor can then use autocorrelation or image processing to determine the rate of movement of micro features through the field of view. Micro features can be scale, pitting or corrosion that return a reflection 'fingerprint'.

Deployment System

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs. The axial moving (i.e. logging) is preferable continuous and at a constant speed.

The deployment system may lower the device downhole to a toe of the well then back uphole towards the surface. In preferred operations, scanning and imaging occur during the uphole movement, when the deployment system is typically most smooth. The downhole movement can be much faster to reduce overall job time. Optionally, the device may scan the tubular during the downhole movement to survey the tubular at a high level, which survey data may be processed to estimate sections of the tubular likely to have the features of interest.

Without loss of generality, each of these components may comprise multiples of such chips, e.g. the memory may be multiple memory chips. For the sake of computing efficiency, several of the functions and operations described separately above may actually by combined and integrated within a chip. Conversely certain functions described above may be provided by multiple chips, operating in parallel. For example, the LM96511 chip operates eight sensors, so four LM96511 chips are used to operate an aperture of 32 sensors.

It will be appreciated that data processing may be performed with plural processors: on the device, at the operations site, and optionally on a remote computer. The term 'processor' is intended to include computer processors, cloud processors, microcontrollers, firmware, GPUs, FPGAs, and electrical circuits that manipulate analogue or digital signals. While it can be convenient to process data as described herein, using software on a general computer, many of the steps could be implemented with purpose-built circuits. In preferred embodiments of the present system, the device processing circuit 15 provides signal conditioning, data processing to identify candidate feature in the low-resolution scan and high-resolution data storage. The remote processor may then perform image processing on the high-resolution images and 2D/3D rendering for visualization of any features found.

It will be appreciated that the various memories discussed may be implemented as one or more memory units. Non-volatile memory is used to store the compressed data and instructions so that the device can function without continuous power. Volatile memory (RAM and cache) may be used to temporarily hold raw data and intermediate computations.

Rendering

Computer 18 or 19 at the surface may render a 2D or 3D geometric model to visualize the tubular to the user. A geometric model represents the surface features spatially (in radial and depth coordinates) and may be stored or displayed in their native polar form or unrolled as a flat surface.

In the present system, some localized features of the tubular are imaged in high resolution and some parts in low resolution, which may or may not be stored. The imaged features may be further image processed to filter the signals, smooth surfaces, and extract properties (e.g. diameter, size, depth, fluid flow, surface characteristics)

A rendering module running on that computer stitches together the images and processes localized features with low-resolution images of the rest of the tubular, if they exist. The data from the first sensor will have less radial, depth and azimuthal resolution than data from the second sensor. The rendering module may use the overlapping high- and low-resolution images at the same locations to better register and filter the low-resolution images, i.e. to modify the first sensor data such that it conforms with the nearby second sensor images.

Without the low-resolution image stored and copied to the surface, the rendering module may simulate the tubular data using expected properties of the tubular and/or properties from the high-resolution localized features. For example, the operator may inform the Rendering Module of the diameter and material of the tubular to simulate the image having that diameter and appropriate surface texturing selected from a database of materials. Alternatively, the simulated areas of the tubular may be informed by the high-resolution areas, excluding the localized features which presumably do not extend across the whole tubular. For example, the portions of the imaged area outside of the perforation will inform the rendering module of the radius from the device and surface texture, which may be copied to the nearby simulated areas that are stitched to the actual imaged areas.

Terms such as "top", "bottom", "distal", "proximate" "downhole", "uphole", "below," "above," "upper, downstream," are used herein for simplicity in describing relative positioning of elements of the tubular or device, as depicted in the drawings or with reference to the surface datum. Headings within the detailed descriptions are for readability and not intended to define the method or device that follows. Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of imaging a localized features in a tubular of an oilwell comprising
    deploying and logging an imaging device longitudinally through the tubular, which imaging device comprises a) a phased array ultrasound sensor and b) a camera, longitudinally spaced-apart from the ultrasound sensor, and having a higher density of sensor elements than the ultrasound sensor;
    imaging the tubular with the camera to generate optical images;
    imaging the tubular with the phased array ultrasound sensor to generate ultrasound images;
    wherein both optical images and ultrasound images capture localized features in the tubular; and
    rendering a visualization of the tubular and localized features to a user from the optical and ultrasound images.

2. The method of claim 1, further comprising automatically detecting the localized features using the optical images.

3. The method of claim 2, further comprising using the ultrasound images to combine with or confirm the localized features detected in the optical images.

4. The method of claim 2, wherein the ultrasound sensor provides increased confidence of the detected localized features and camera provides a higher resolution image.

5. The method of claim 2, further comprising processing the optical images or ultrasound images to define candidate areas having candidate localized features then automatically detecting localized features in the defined candidate areas.

6. The method of claim 1, wherein the localized features are at least one of: perforations, ports, holes, corrosion, pits, cracks, connections, wash-outs, or cable clamps.

7. The method of claim 1, wherein rendering comprises overlapping the higher resolution optical images and lower resolution ultrasound images at the same locations to register the lower resolution ultrasound images.

8. The method of claim 1, wherein the step of rendering further comprises modifying the optical images to conform with nearby ultrasound images.

9. The method of claim 1, further comprising using autocorrelation of micro features of the tubular in the optical images or ultrasound images for registration.

10. The method of claim 1, wherein the step of rendering creates a 2D or 3D geometric model representing the tubular and localized features in spatial coordinates.

11. The method of claim 1, wherein some parts of the tubular are imaged in high resolution using the camera and some parts in low resolution using the ultrasound sensor.

12. The method of claim 1, further comprising image processing the captured localized features in the optical images or ultrasound images to extract a size of the localized feature.

13. The method of claim 1, further comprising selecting a feature type and using detection algorithms on the optical images or ultrasound images to determine a matching value greater than a threshold value to identify candidate areas of the image that contain that feature type.

14. The method of claim 13, wherein the detection algorithm is one or more of: autocorrelation, circle find, Convolutional Neural Net, Region Proposal, template matching, or computer vision.

15. The method of claim 1, wherein the images are processed by a remote computer after logging.

16. A system for imaging localized features in a tubular in an oilwell comprising:

an elongate imaging device deployable in and moveable through the tubular;
a phased array ultrasound sensor of the imaging device;
a camera of the imaging device, longitudinally spaced-apart from the phased array ultrasound sensor and having higher density of sensor elements than the ultrasound sensor;
one or more memory units for storing sensor data; and
a processor arranged to:
i) operate the camera to image the tubular to generate optical images;
ii) operate the phased array ultrasound sensor to image the tubular to generate ultrasound images; and
iii) store the images in the memory,
wherein both optical images and ultrasound images capture localized features in the tubular; and
a computer remote from the imaging device and arranged to render a visualization of the tubular and localized features to a user from the optical and ultrasound images.

17. The system of claim 16, wherein the computer is further arranged to automatically identify the localized features using the optical images.

18. The system of claim 17, wherein the computer is further arranged to use the ultrasound image to combine with or confirm the localized features identified in the optical image.

19. The system of claim 17, wherein the ultrasound sensor provides increased confidence of the identified localized features and the camera provides a higher resolution image of the localized features.

20. The system of claim 16, wherein the localized features are at least one of: perforations, ports, holes, corrosion, pits, cracks, connections, wash-outs, or cable clamps.

21. The system of claim 16, wherein rendering comprises overlapping the higher resolution optical images and lower resolution ultrasound images at the same locations to register the lower resolution ultrasound images.

22. The system of claim 16, wherein the step of rendering further comprises modifying the optical images to conform with nearby ultrasound images.

23. The system of claim 16, further comprising using autocorrelation of micro features in the optical images or ultrasound images for registration.

24. The system of claim 16, wherein the computer is further arranged to render a 2D or 3D geometric model representing the localized features.

25. The system of claim 16, wherein some parts of the tubular are imaged in high resolution using the camera and some parts in low resolution using the ultrasound sensor.

26. The system of claim 16, wherein the computer is further arranged to image process the captured localized features in the optical images or ultrasound images to extract a size of the localized feature.

27. The system of claim 16, wherein the computer is further arranged to process the optical images or ultrasound images to define candidate areas having candidate localized features then automatically detecting localized features in the defined candidate areas.

28. The system of claim 27, wherein said detecting uses one or more of: autocorrelation, circle find, Convolutional Neural Net, Region Proposal, template matching, or computer vision.

29. The system of claim 16, wherein the camera comprises four separate radial-facing cameras, each capturing slightly overlapping sectors of the tubular to capture a 360° optical image.

30. The system of claim 16, wherein the phased array ultrasound sensor is an array of piezoelectric elements distributed radially around the imaging device.

* * * * *